(12) United States Patent
Albrecht et al.

(10) Patent No.: US 11,954,643 B2
(45) Date of Patent: Apr. 9, 2024

(54) SYSTEM AND METHOD FOR GENERATING A PLANT BILL OF PROCESS

(71) Applicant: Siemens Aktiengesellschaft, Munich (DE)

(72) Inventors: Sebastian Albrecht, Hallbergmoos (DE); Stephan Grimm, Munich (DE); Daniel Meyer-Delius Di Vasto, Munich (DE); Maja Milicic Brandt, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 924 days.

(21) Appl. No.: 16/963,626

(22) PCT Filed: Jan. 23, 2019

(86) PCT No.: PCT/EP2019/051572
§ 371 (c)(1),
(2) Date: Jul. 21, 2020

(87) PCT Pub. No.: WO2019/145331
PCT Pub. Date: Aug. 1, 2019

(65) Prior Publication Data
US 2020/0349508 A1    Nov. 5, 2020

(30) Foreign Application Priority Data

Jan. 29, 2018 (EP) .................................. 18153879

(51) Int. Cl.
*G06Q 10/0875* (2023.01)
*G05B 19/418* (2006.01)
*G06Q 30/04* (2012.01)

(52) U.S. Cl.
CPC ... *G06Q 10/0875* (2013.01); *G05B 19/41815* (2013.01); *G05B 19/41865* (2013.01); *G05B 19/41885* (2013.01)

(58) Field of Classification Search
CPC .............. G06Q 10/0875; G06Q 10/08; G05B 19/41815; G05B 19/41865; G05B 19/41885
(Continued)

(56) References Cited

U.S. PATENT DOCUMENTS 9,535,902 B1 * 1/2017 Michalak ............ G06F 16/3331
2004/0019604 A1 * 1/2004 Ballas .................. G06Q 10/087
(Continued)

FOREIGN PATENT DOCUMENTS

| CN | 101916404 A | 12/2010 |
|---|---|---|
| CN | 104463394 A | 3/2015 |

(Continued)

OTHER PUBLICATIONS

Stuart Russel, Peter Norvig; Artificial Intelligence—A Modern Approach, Chapter 11: Classical Planning; Addison Wesley; Edition: 3rd Edition (May 18, 2016); ISBN: 1292153962.
(Continued)

*Primary Examiner* — Garcia Ade
(74) *Attorney, Agent, or Firm* — Schmeiser, Olsen & Watts LLP

(57) ABSTRACT

A production support system for generating a plant bill of process, PBoP, from a product bill of process, PdBoP, for a production plant, a corresponding method and a corresponding computer program product is provided. The production support system includes: (a) a reasoning component for determining possible cells; (b) a selection component for selecting all those cells that address operation capabilities used in the PdBoP; (c) an operation capabilities identifying
(Continued)

component for identifying, additional operation capabilities for the selected cells which include at least two production entities, PET, based on the operation capabilities of the individual production entities, PET; and (d) a PBoP generating component for generating the PBoP from the PdBoP using the additional operation capabilities identified by the operations identifying component.

14 Claims, 2 Drawing Sheets

(58) Field of Classification Search
USPC .......................................................... 705/29
See application file for complete search history.

(56) References Cited

U.S. PATENT DOCUMENTS

| | | | |
|---|---|---|---|
| 2004/0250166 | A1 | 12/2004 | Dahlquist |
| 2015/0081077 | A1* | 3/2015 | Li .................... G05B 19/41865 |
| | | | 700/100 |
| 2016/0071046 | A1 | 3/2016 | Gujar et al. |
| 2016/0210578 | A1* | 7/2016 | Raleigh .................. G06Q 30/04 |
| 2017/0308067 | A1 | 10/2017 | Lamparter et al. |
| 2017/0329295 | A1* | 11/2017 | Zahorcak ......... G06Q 10/06316 |

FOREIGN PATENT DOCUMENTS

| | | |
|---|---|---|
| CN | 107077130 A | 8/2017 |
| CN | 107402554 A | 11/2017 |
| DE | 4213116 A1 | 10/1993 |
| EP | 1393141 A1 | 3/2004 |

OTHER PUBLICATIONS

PCT International Search Report and Written Opinion of International Searching Authority dated Aug. 3, 2019 corresponding to PCT International Application No. PCT/EP2019/051572 filed Jan. 23, 2019.
European Extended Search Report dated Jun. 8, 2018 for Application No. 18153879.4.

* cited by examiner

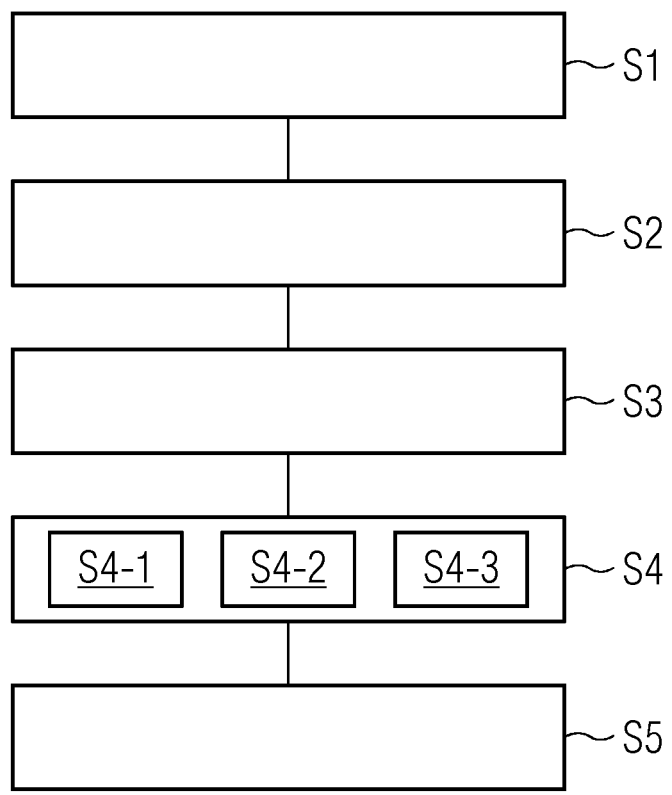

SYSTEM AND METHOD FOR GENERATING A PLANT BILL OF PROCESS

CROSS-REFERENCE TO RELATED APPLICATIONS

This application claims priority to PCT Application No. PCT/EP2019/051572, having a filing date of Jan. 23, 2019, which is based on EP Application No. 18153879.4, having a filing date of Jan. 29, 2018, the entire contents both of which are hereby incorporated by reference.

FIELD OF TECHNOLOGY

The following relates to a production support system and to a method for generating a plant bill of process, PBoP, from a product bill of process, PdBoP, for a production plant.

BACKGROUND

A production plant which can produce, or manufacture, a wide variety of different products can comprise a plurality of physical production modules, in particular hardware entities such as manufacturing machines and/or transport machines to transport workpieces during the manufacturing process. The hardware entities may also be called hardware instances.

In future production scenarios, flexibility is envisioned to be achieved by production entities acting autonomously on the basis of so called "skills", which they offer to manufacturing execution systems (MESs). Skills are an abstraction of production functionality whose execution form the basic steps of an ad-hoc production process that is being flexibly constructed by the MES, opposed to its conventional, manual construction by human engineers.

The basis for the construction of ad-hoc production processes is a bill of process (BOP) that prescribes the manufacturing operations to be carried out for manufacturing a specific product. PLM tools distinguish between the product-specific "PdBoP" (Product Bill of Process) and the plant-specific "PBoP" (Plant Bill of Process): the PdBoP describes the required manufacturing operations independent from a target production plant, while the PBoP takes plant-specific aspects into account, such as intermediate operations for transport or for the preparation and setup of machines.

It is known that so-called classical AI planners may be utilized for certain aspects of controlling a production process. Such classical AI planners are e.g. described in Stuart Russel, Peter Norvig; Artificial Intelligence—A Modern Approach, Chapter 11: Classical Planning; Addison Wesley; Edition: 3rd Edition (18 May 2016); ISBN: 1292153962.

A particular challenge in deriving the PBoP from the PdBoP lies in the different granularities of the operations in the two types of BOP: any PdBoP operation might require multiple PBoP operations that are realized by a combination of the skills offered by single automation components (SACs) forming automation cells (ACs).

For example, a cell that combines two single-arm robots (SARs) can offer a new 'emergent' skill for operations that actually require two-arm robot functionality. Moreover, the PBoP might specify additional machine set-up operations, such as moving the robot to an initial position before beginning an assembly task. Hence, the aspects of composite cells and cooperative machines have to be taken into account when planning with emergent skills.

In a conventional industrial production plant, it is a difficult and time-consuming process for a human engineer to construct the PBoP from the PdBoP. Depending on the number of production entities and the time constraints of a specific production plant it may even be impossible for a human engineer to generate the PBoP from the PdBoP.

SUMMARY

An aspect relates to automate the process of generating a PBoP from a given PdBoP with respect to an available production plant.

Embodiments of the invention provides, according to the first aspect, a production support system for generating a plant bill of process, PBoP, from a product bill of process, PdBoP, for a production plant, comprising:
(a) a reasoning component for determining possible cells, wherein each cell is either a production entity, PET, or a combination of at least two production entities;
(b) a selection component for selecting all those cells determined by the reasoning component that address operation capabilities used in the PdBoP;
(c) an operation capabilities identifying component for identifying, by inference, additional operation capabilities for the cells selected by the selection component which comprise at least two production entities based on the operation capabilities of the individual production entities;
(d) a PBoP generating component for generating the PBoP from the PdBoP using the additional operation capabilities identified by the operation capabilities identifying component.

Advantageously, an ontology describing the capabilities and limitations of hardware components (production entities) is combined with components for reasoning and planning to solve the overall task.

Inferences are steps in reasoning, moving from premises to conclusions. Inference is generally divided into three kinds: deduction, induction, and abduction. Deduction is inference deriving logical conclusions from premises known or assumed to be true with the laws of valid inference being studied in logic. Induction is inference from particular premises to a universal conclusion. Abduction is inference to the best explanation. Inference by deduction is preferred in the present context.

In a possible embodiment, the reasoning component is configured to determine the possible cells based on at least one of the following:
a location of at least one production entity;
a hardware property of at least one production entity;
a software running on, or stored in, at least one production entity;
a response time of at least one production entity.

In a further possible embodiment, the operation capabilities identifying component comprises a planning component configured to pose a planning problem by providing a set of pre-conditions for the production plant and a set of post-conditions for the production plant.

In a further possible embodiment, the operation capabilities identifying component comprises a cell evaluating component configured to add production entities of a cell and their individual operation capabilities to the planning problem.

In a further possible embodiment, the operation capabilities identifying component comprises a sequence generating component configured to generate a sequence of the individual operation capabilities such that the planning problem is solved.

In a further possible embodiment, the production support system comprises an output unit configured to output a list of the additional operation capabilities identified by the operation capabilities identifying component to a user.

In a further possible embodiment, the production support system comprises a comparator unit configured to compare the PBoP generated by the generating component to a pre-formed PBoP and to output a comparator signal based on differences between the PBoP generated by the generating component and the pre-formed PBoP.

In a further possible embodiment, the production support system comprises a selector unit configured to provide the PBoP generated by the generating component to a user and to allow the user to select and/or adapt the PBoP.

In a further possible embodiment, the production support system comprises an executing component configured to control the production entities of the production plant based on the PBoP generated by the generating component.

Embodiments of the invention also provides, according to a second aspect, a production plant comprising
- a plurality of production entities adapted to perform production process steps of a production process and
- a production support system according to the first aspect.

Embodiments of the invention further provides, according to a third aspect, a method for generating a plant bill of process, PBOP, from a product bill of process, PdBoP, for a production plant, comprising steps of:

providing a product bill of process, PdBoP, for a production plant;

determining possible cells, wherein each cell is either a production entity, or a combination of at least two production entities;

selecting all those of the cells determined by the reasoning component that address operations used in the PdBoP;

identifying additional operation capabilities for the cells selected by the selection component which comprise at least two production entities, based on the operation capabilities of the individual production entities;

generating the PBoP from the PdBoP using the operations identified by the operation capabilities identifying component.

In a further possible embodiment of the method, determining the possible cells is based on at least one of the following:
- a location of at least one production entity;
- a hardware property of at least one production entity, PET;
- a software running on, or stored in, at least one production entity;
- a response time of at least one production entity.

In a yet further possible embodiment, the identifying of the additional operation capabilities comprises posing a planning problem by providing a set of pre-conditions for the production plant and a set of post-conditions for the production plant.

In a still further possible embodiment, the identifying of the additional operation capabilities comprises adding production entities of a cell and their individual operation capabilities to the planning problem.

In a still further possible embodiment, the identifying of the additional operation capabilities comprises generating a sequence of the individual operation capabilities such that the planning problem is solved.

Embodiments of the invention also provides, according to a fourth aspect, a computer program comprising computer program code which, when executed, performs the method according to the second aspect.

Embodiments of the invention further provides, according to a fifth aspect, a computer program medium comprising a computer program code according to the fourth aspect stored on a machine-readable non-volatile storage medium.

In the following, possible embodiments of the different aspects of the invention are described in more detail with reference to the enclosed drawings.

BRIEF DESCRIPTION

Some of the embodiments will be described in detail, with reference to the following figures, wherein like designations denote like members, wherein:

FIG. 3 shows a flowchart of a possible exemplary embodiment of a method for generating a plant bill of process, PBoP, from a product bill of process, PdBoP, for a production plant according to the third aspect of embodiments of the present invention.

DETAILED DESCRIPTION

Figure 1:
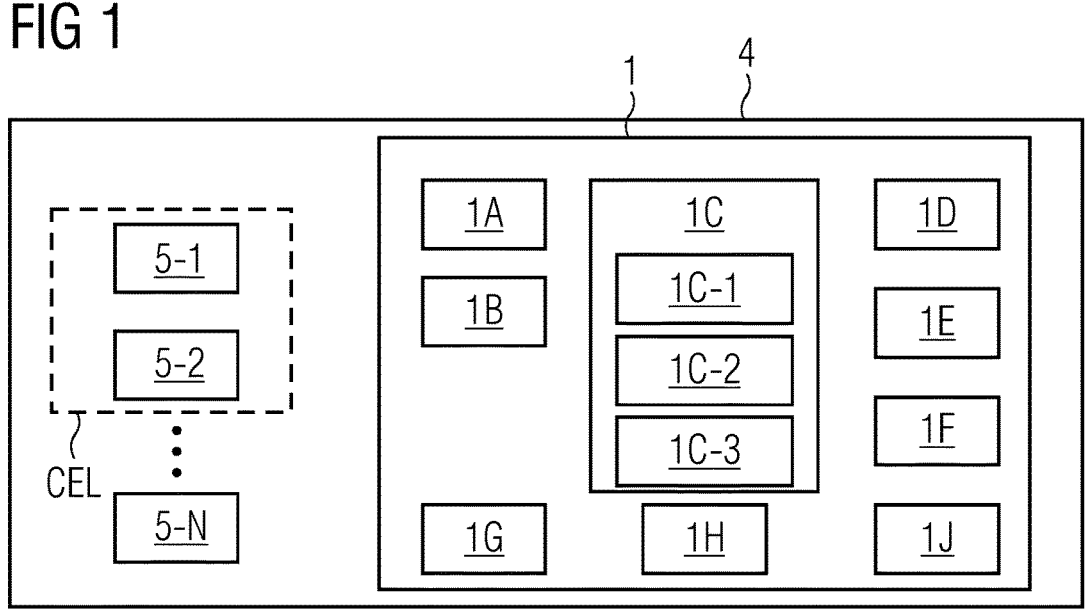
FIG. 1 shows a schematic diagram of a production support system according to the first aspect of embodiments of the present invention as well as a schematic diagram of a production plant according to the second aspect of embodiments of the present invention.

The schematic diagram of FIG. 1 illustrates a production support system 1 according to the first aspect of embodiments of the present invention for generating a plant bill of process, PBOP, from a product bill of process, PdBoP, for a production plant.

The schematic diagram of FIG. 1 also illustrates a production plant 4 according to the second aspect of embodiments of the present invention, which comprises a production support system 1.

The production plant 4 can comprise a plurality of different and complex physical production entities $5\text{-}i$ to perform process steps, in particular manufacturing steps.

Production entities PET $5\text{-}i$ can comprise machines performing process steps on work pieces and/or intermediate products during the production process. The production entities (PET) $5\text{-}i$ can also comprise physical transport production modules adapted to transport workpieces and/or intermediate products between predefined positions to perform associated production process steps. These transport production modules can comprise for instance robot arms of robot units and/or conveyor belts.

In the illustrated example of FIG. 1, the production plant 4 comprises a shop floor with different physical production entities PET 5-1, 5-2 . . . 5-N as illustrated in FIG. 1. The physical production entities PET $5\text{-}i$ can be grouped in so-called cells CEL such that each cell CEL is a combination of physical production entities PET $5\text{-}i$, or, in other words, of hardware instances.

Figure 2:
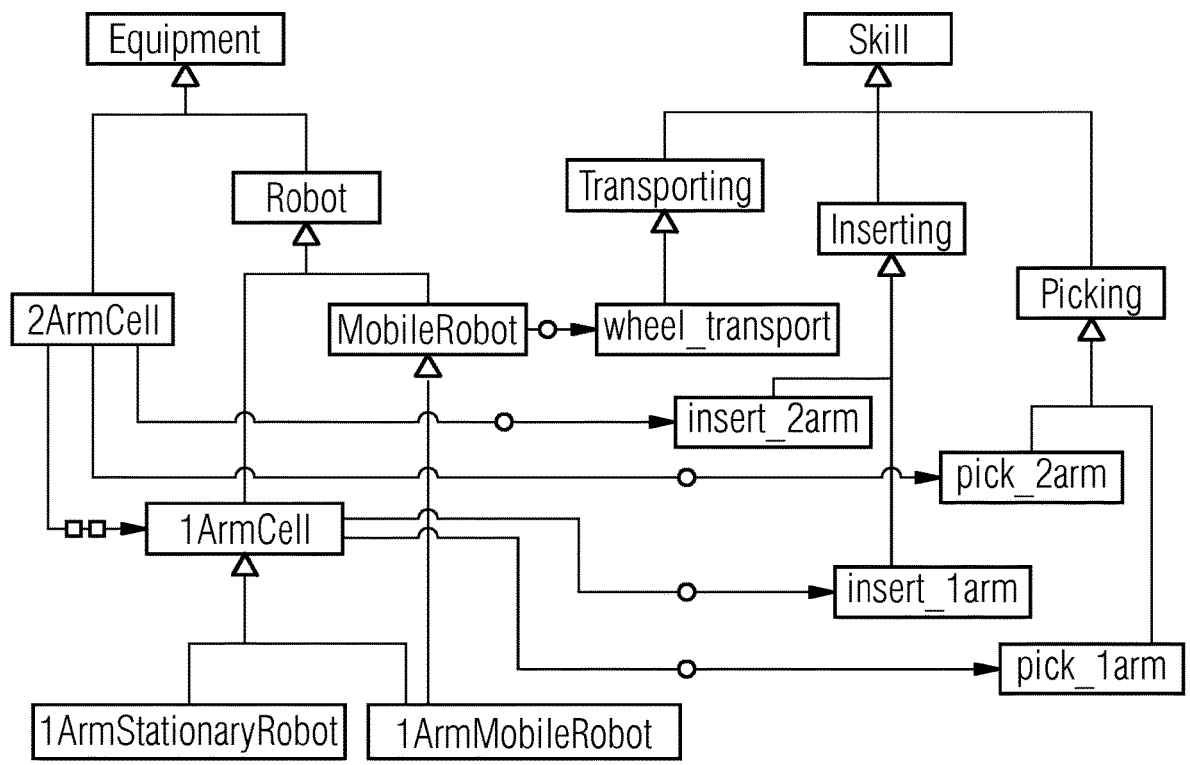
FIG. 2 shows a schematic diagram of a part of the production plant of FIG. 1 in detail.

FIG. 2 schematically illustrates a model of a part of the production plant 4 in detail.

For example, a first production entity PET 5-1 may be a first one-armed robot 1ArmRobot, and a second production entity PET 5-2 may be a second one-armed robot 1ArmRobot.

Each production entity PET $5\text{-}i$ has a set of skills, or operation capabilities. Some of these operation capabilities are indicated in FIG. 3 by lines with a circle displayed on them. For example, each one-armed robot 1ArmRobot can perform the operation capabilities insert_1arm and pick_1arm. The operation capabilities insert_1arm and is a sub-class of an operation capability class called "Inserting", and the operation capabilities pick_1arm and is a sub-class of an operation capability class called "Picking", indicated by arrows with a large empty triangle arrowhead, respectively.

Each one-armed robot 1ArmRobot is itself a sub-class of a class "Robot" which, in turn, is a sub-class of a class "Equipment". The "Robot" class may comprise other types of robots such as a mobile robot MobileRobot which is able to perform e.g. the operation capability of transporting an item on wheels, "wheel_transport". The "wheel_transport" operation capability is a sub-class of an operation capability class called "Transporting". In turn, "Transporting", "Inserting" and "Picking" are all sub-classes of operation capabilities, "Skill".

Finally, some production entities PET 5-$i$ may be sub-classes of more than one class. For example, a one-armed mobile robot (1ArmMobileRobot) may be a sub-class of both the equipment class "1ArmRobot" as well as of the equipment class "Mobile Robot", whereas a one-armed stationary robot (1ArmStationaryRobot) is only a sub-class of the equipment class "1ArmRobot".

In a high-level description such as in a PdBoP or for use in a PdBoP, some of the relationships explained above may be described by:
Robot subclassOf Equipment
1ArmRobot subclassOf Robot
MobileRobot subclassOf Robot
Stationary1ArmRobot subclassOf 1ArmRobot
Mobile1ArmRobot subclassOf 1ArmRobot
Mobile 1ArmRobot subclassOf MobileRobot Referring back to FIG. 1, the production support system MSS 1 comprises a reasoning component 1A for determining all possible cells, wherein each cell CEL is a combination of at least one manufacturing entity MET. In other words, each cell CEL either comprises one production entity PET 5-$i$, or comprises a plurality, i.e. at least two, production entities PET 5-$i$.

The reasoning component 1A may be realized in hardware, such as a circuit or a printed circuit board and/or comprising transistors, logic gates and other circuitry. Additionally, the reasoning component 1A may be at least partially realized in terms of software. Accordingly, the reasoning component 1A may comprise, or be operatively coupled to, a processor and a memory storing a software or a firmware that is executed by the processor to perform the functions of the reasoning component 1A. Signals may be received by an input interface of the reasoning component 1A and signals that the processor of the reasoning component 1A creates may be outputted by an output interface of the reasoning component 1A. The reasoning component 1A may be implemented, at least partially, as a microcontroller, an ASIC, an FPGA and so on.

The production support system MSS 1 further comprises a selection component 1B for selecting all those cells determined by the reasoning component 1A that address operations used in the PdBoP. In other words, the selection component 1B is configured to select all those cells, within the cells determined by the reasoning component 1A, which have operation capabilities that may be used for the operations described in the PdBoP. Information which operation capabilities of cells, or of production entities PET 5-$i$, may be used for which operations described in a PdBoP may be contained in a database such as a look-up table.

The reasoning component 1A is configured to determine the possible cells CEL based on at least one of the following:
a location of at least one production entity PET 5-$i$;
a hardware property of at least one production entity PET 5-$i$;
a software running on, or stored in, at least one production entity PET 5-$i$;
a response time of at least one production entity PET 5-$i$.

It is advantageous to consider the location of the at least one production entity PET 5-$i$, in particular of at least two production entities PET 5-$i$, because production entities PET 5-$i$ may have to share a common workspace to form a cell CEL. For example, if two one-armed robots 1ArmRobot are supposed to jointly handle one item, the two one-armed robots 1ArmRobot must be positioned such that they can both reach that one item at least when the time arrives for them to do so.

It is advantageous to consider at least one hardware property of at least one production entity PET 5-$i$ because also the hardware properties impose restrictions on the possibilities of forming cells CEL. For example, when three production entities PET 5-$i$ would have to operate, or be positioned, within the same, narrow common workspace as one cell CEL, certain production entities PET 5-$i$ could be excluded for consideration for that cell CEL when those production entities PET 5-$i$ are too large to fit in the narrow common workspace.

As another example, it may be physically impossible for a certain production entity PET 5-$i$ to handle an item in such a way as required because of the properties of another production entity PET 5-$i$. For instance, when an item with a weight of 50 kg is to be lifted, then a one-armed robot 1ArmRobot capable of lifting 30 kg may be combined to a cell CEL with a one-armed robot 1ArmRobot capable of lifting 20 kg or vice versa, but the reasoning component 1A would not select two of the one-armed robots 1ArmRobot capable of lifting only 20 kg to form the cell CEL.

It is advantageous to consider the software running on, or stored in, at least one production entity PET 5-$i$, e.g. a type of operating system running the production entity PET 5-$i$, or a respond time of the production entity PET 5-$i$.

The selection component 1B may be realized in hardware, such as a circuit or a printed circuit board and/or comprising transistors, logic gates and other circuitry. Additionally, the selection component 1B may be at least partially realized in terms of software. Accordingly, the selection component 1B may comprise, or be operatively coupled to, a processor and a memory storing a software or a firmware that is executed by the processor to perform the functions of the selection component 1B. Signals may be received by an input interface of the selection component 1B and signals that the processor of the selection component 1B creates may be outputted by an output interface of the selection component 1B. The selection component 1B may be implemented, at least partially, as a microcontroller, an ASIC, an FPGA and so on.

The production support system 1 further comprises an operation capabilities identifying component 1C for identifying additional operation capabilities (or "emergent skills") for the cells CEL selected by the selection component 1B which comprise at least two production entities PET 5-$i$ based on the operation capabilities of the individual production entities PET 5-$i$.

The operation capabilities identifying component 1C may be realized in hardware, such as a circuit or a printed circuit board and/or comprising transistors, logic gates and other circuitry. Additionally, the operation capabilities identifying component 1C may be at least partially realized in terms of software. Accordingly, the operation capabilities identifying component 1C may comprise, or be operatively coupled to, a processor and a memory storing a software or a firmware that is executed by the processor to perform the functions of the operation capabilities identifying component 1C. Signals may be received by an input interface of the operation capabilities identifying component 1C and signals that the processor of the operation capabilities identifying component 1C creates may be outputted by an output interface of the operation capabilities identifying component 1C. The operation capabilities identifying component 1C may be implemented, at least partially, as a microcontroller, an ASIC, an FPGA and so on.

The operations identifying component 1C optionally comprises a planning component 1C-1 for posing a planning problem by providing a set of pre-conditions for the manufacturing plant and a set of post-conditions for the manufacturing plant.

The prefixes pre- and post-refer to time states before (pre-) and after (post-) the producing, manufacturing, or processing, of at least one good to be produced or processed according to the PdBoP.

Since the process from PdBoP is described via pre- and post-conditions, the planning problem gets a set of initial facts corresponding to the pre-conditions and the goal is formulated according to the post-conditions.

The operations identifying component 1C optionally further comprises a cell evaluating component 1C-2 for adding production entities 1 of a cell CEL and their individual operation capabilities to the planning problem. In most cases it should be assured that at least one production entity PET 5-$i$ provides a detailed version of a skill from the PdBoP.

The operations identifying component 1C optionally further comprises a sequence generating component 1C-3 for generating a sequence of the individual operation capabilities such that the planning problem is solved. The sequence generating component 1C-3 may e.g. be configured to start a classical planning algorithm such as FastDownward.

The sequence generating component 1C-3 may also use automated planning techniques from the field of symbolic Artificial Intelligence. In particular, classical planning techniques and classical AI planners may be utilized, e.g. as described in Stuart Russel, Peter Norvig; Artificial Intelligence—A Modern Approach, Chapter 11: Classical Planning; Addison Wesley; Edition: 3rd Edition (18 May 2016); ISBN: 1292153962.

The production support system 1 may further comprise a memory storage component 1F configured to save the sequences of individual operation capabilities created by the sequence generating component 1C-3, and to provide the saved sequences for further use such that they do not have to be generated repeatedly.

The resulting plan to solve the planning problem may then be analyzed by the production support system 1: if more than one operation is used in that plan, the plan itself is a "emergent skill", i.e. an additional operation capability.

The production support system further comprises a PBoP generating component 1D for generating the PBoP from the PdBoP using the additional operation capabilities identified by the operation capabilities identifying component 1C.

The generating component 1D may use automated planning techniques from the field of symbolic Artificial Intelligence. In particular, classical planning techniques and classical AI planners may be utilized, e.g. as described in Stuart Russel, Peter Norvig; Artificial Intelligence—A Modern Approach, Chapter 11: Classical Planning; Addison Wesley; Edition: 3rd Edition (18 May 2016); ISBN: 1292153962.

The PBoP may be a result of a planning problem based on the identified additional operation capabilities in combination with the cell-based operation descriptions, or a result of a sequence of such planning problems if the sequence of the PdBoP is used.

The generating component 1D may be realized in hardware, such as a circuit or a printed circuit board and/or comprising transistors, logic gates and other circuitry. Additionally, the generating component 1D may be at least partially realized in terms of software. Accordingly, the generating component 1D may comprise, or be operatively coupled to, a processor and a memory storing a software or a firmware that is executed by the processor to perform the functions of the generating component 1D. Signals may be received by an input interface of the generating component 1D and signals that the processor of the generating component 1D creates may be outputted by an output interface of the generating component 1D. The generating component 1D may be implemented, at least partially, as a microcontroller, an ASIC, an FPGA and so on.

The production support system 1 may further comprise an output unit 1G configured to output a list of the additional operation capabilities identified by the operation capabilities identifying component 1C to a user. The output unit 1G may be realized e.g. as a display and/or an acoustic output system such that the list may be output visually and/or acoustically.

Optionally, the production support system 1 may also comprise a comparator unit 1H configured to compare the PBoP generated by the generating component 1D to a pre-formed PBoP and to output a comparator signal based on differences between the PBoP generated by the generating component 1D and the pre-formed PBoP. The comparator signal may comprise an indication which PBoP is to be considered as more advantageous according to a given, or adjustable, set of criteria. The comparator unit 1H may utilize, or be realized as, a display and/or an acoustic output system such that the comparator signal may be output visually and/or acoustically.

Furthermore, the production support system 1 may comprise a selector unit 2C configured to provide the PBoP generated by the generating component 1D to a user and to allow the user to select and/or adapt the PBoP. The selector unit 1J may comprise a display and/or an acoustic output system such that the PBoP may be output visually and/or acoustically to the user, and the selector unit 1J may further comprise a user interface that allows the user to select and/or adapt the PBoP. Such a user interface may be realized as, or comprise, a keyboard, a touchscreen, a trackpad, or any other computer input device.

In case that at least two of the output unit 1G, the comparator unit 1H and the selector unit 1J are provided in the production support system 1, they may share a single display and/or loudspeaker system.

The production support system 1 may also comprise an executing component 1E configured to control at least one of the production entities 1 of the production plant based on the PBoP generated by the generating component 1D, or to transmit the generated PBoP to further controlling and/or monitoring systems.

Referring to the example of FIG. 2, by means of a classical planner, one can encapsulate skill plans involving more than one equipment instance (production entity PET 5-$i$) into a new cell skill and re-use it. For instance, an operation capability "insert_2arm" which requires to robot arms (i.e. originally a two-armed robot having two arms) may be decomposed into a sequence of pick, pick, hold, insert_1arm.

FIG. 2 illustrates that the cell "2ArmCell" (itself a subclass of "Equipment") thus comprises two production entities PET 5-*i*, as indicated by the two squares displayed on the arrow pointing towards "1Arm Robot". FIG. 2 further illustrates that the cell "2ArmCell" is capable of performing the additional operation capabilities "insert_2arm" (i.e. an insert operation capability originally restricted to two-armed robots) and "pick_2arm" (i.e. a pick operation capability originally restricted to two-armed robots). "Insert_2arm" is a sub-class of "Inserting", and "pick_2arm" is a sub-class of "Picking".

"Picking" generally includes picking an item, or a quantity of a material, up from somewhere, e.g. from the ground, from a conveyor belt, out of a storage bin, out of a tank, and so on. "Inserting" generally includes putting an items, or a quantity of material, somewhere, e.g. on the ground, on a conveyor belt, into a storage bin, into a tank, and so on.

In the abstract high-level description, the above may be formulated as:

2ArmCell subclassOf Equipment

In particular, the 2ArmCell CEL is defined to consist of two 1ArmRobot parts 5-1 and 5-2. By means of a predefined Cell Generation Rule ("1ArmRobot+1ArmRobot=2ArmCell"):

1ArmRobot (?r1), 1ArmRobot (?r2), ?r1!=?r2, newInstance(?cell)->2ArmCell(?cell), hasPart(?cell, ?r1), hasPart(?cell, ?r2)

it may be enforced that whenever two different instances of 1ArmRobot are found, a new instance of 2ArmCell consisting of them is generated by the reasoning component 1A.

The PdBoP is defined as a list of operations, or operation capabilities, (forming a process) to be executed, e.g. the PdBoP below describes the assembly process of a simple product that consists of two subassemblies, and all operations require an inserting skill:

insert(step1, part1, part2, assembly1)
    insert(step2, part3, part4, assembly2)
    insert(step3, assembly1, assembly2, product)

Going into further detail of the example of FIG. 2, the instance 2ArmCell may in total have the skills, or operation capabilities, pick_2arm (<10kg), hold_2arm, place_2arm, insert_2arm.

Skills are advantageously modeled as operators in the planning domain, by means of their parameters, pre-conditions and post-conditions. For example, "pick_1arm" requires an available instance of 1ArmRobot and an object lighter than 7 kg.

In the abstract, high-level description, this may be defined by:

operator pick_1arm(?1arobot,?object)
    pre-conditions
    1ArmRobot(?1arobot)
    available(?1arobot)
    weight_kg(?object)<=7
    hasLocation(?object,?loc)
    post-conditions
    hasLocation(?object,?1arobot)
    Similarly, "insert_2arm" may be defined as below:
    operator insert_2arm(?2acell, ?partA, ?partB)
    pre-conditions
      2ArmCell(?2acell)
      available(?2acell)
      insert(?step, ?partA, ?partB, ?assembly)
      available(?partA)
      available(?partB)
      not available(?assembly)
    post-conditions
      available(?assembly)
      hasLocation(?assembly,?2acell)

Note that "insert_2arm" is in its nature a composite skill that, e.g. can be decomposed into a sequence "pick_1arm, pick_1arm, hold_1arm, insert_1arm". Such decompositions can be computed by a classical AI planner, e.g. utilizing symbolic artificial intelligence techniques, and saved for re-use, e.g. in the memory storage component 1F. The memory storage component 1F may be realized as any non-volatile computer memory structure.

Moreover, one of the arms may have the purpose of fixating one part, while the other one inserts the second part into it. Without the second arm, one of the parts would have to be fixated by some other means, e.g. a fixture. If a fixture and another arm are not available, insert_1arm cannot be performed. Another example of when a 2ArmCell may be needed is if an object heavier of 7 kg needs to be picked.

An operator for the "wheel_transport" skill, or operation capability, may be defined as follows:

operator wheel_transport(?mr, ?loc1, ?loc2)
    pre-conditions
      available (?mr)
      MobileRobot(?mr)
      hasLocation(?mr, ?loc1)
      ?loc1 !=?loc2
    post-conditions
      hasLocation(?mr, ?loc2)

Moreover, an operator "build_cell" for building, or defining, a new cell CEL is provided that ensures that a virtual cell is present whose parts share the same work area.

operator build_cell(?e1, ?e2, ?cell)
    pre-conditions
      available (?e1)
      available (?e2)
      Equipment(?cell)
      not available(?cell)
      hasPart(?cell, ?e1)
      hasPart(?cell, ?e2)
      hasLocation(?e1, ?wa)
      hasLocation(?e2, ?wa)
      WorkArea(?wa)
    post-conditions
      not available (?e1)
      not available (?e2)
      available (?cell)
      hasLocation(?cell,?wa)

Similarly, an operator "dismantle_cell" may be provided for dismantling cells CEL and make their components available again:

operator dismantle_cell(?cell,?e1, ?e2)
    pre-conditions
      available(?cell)
      hasPart(?cell, ?e1)
      hasPart(?cell, ?e2)
      hasLocation(?cell,?wa)
      WorkArea(?wa)
    post-conditions
      available (?e1)
      available (?e2)
      not available (?cell)
      hasLocation(?e1, ?wa)
      hasLocation(?e2, ?wa Operations of building (or forming) and/or operations of dismantling (or destroying) cells may advantageously be provided in the PBoP, which may be used to build or destroy, respectively, such cells in a planner's (e.g. a classical planner's) information space. One advantage of this is that a machine set-up time may be considered when a certain task, plan or operation is scheduled later on.

Now assume that the initial setup is described by the following set of facts:

1ArmMobileRobot(mr)
available(mr)
1ArmStationaryRobot(sr)
Available(sr)
hasLocation(sr, workingarea1)
hasLocation(part1, workingarea1)
hasLocation(part2, workingarea1)
hasLocation(part3, workingarea1)
hasLocation(part4, workingarea1)
hasLocation(mr, workingarea2)

The cell generation rule will be triggered and a new cell cell123 with the properties:

2ArmCell(cell123)
hasPart(cell123, sr)
hasPart(cell,mr)

will be generated by the generating component 1D. In this moment, this cell is still virtual, e.g. not yet available. However after the mobile robot mr is transported from workingarea2 to workingarea1, the preconditions of build_cell operator are fulfilled and after its execution, the cell123 becomes available. The corresponding PBoP can be generated by means of a classical planner and may look as follows:

PBoP:
  wheel_transport(mr, workingarea2, workingarea1)
  build_cell(sr, mr, cell123)
    insert_2arm(cell123, part1, part2, assembly1)
    insert_2arm(cell123, part3, part4, assembly2)
    insert_2arm(cell123, assembly1, assembly2, product)

The PBoP generated by the generating component 1D advantageously comprises additional operations corresponding to the identified additional operation capabilities (or "emergent skills") as well as the corresponding original operations. For example, the PBoP may comprise motions of a mobile platform that has to be at a certain location (e.g. a shared workspace) in order to form a certain cell at a certain time.

It should be understood that all of the parts and components described as mandatory or optional for the production support system 1 may be integrated in one physical device, or may be distributed over several devices or cloud servers. The production support system 1 may be provided, or run, on a central server remote from the production plant 4, on a local server at the premises of the production plant 4, locally in a robot controller of the production plant 4, or in a distributed way.

FIG. 3 shows a flowchart of a possible exemplary embodiment of a method for generating a plant bill of process, PBOP, from a product bill of process, PdBoP, for a production plant according to the third aspect of embodiments of the present invention.

The method is suitable for use with the production support system 1 according to the first aspect and/or the production plant 4 according to the second aspect, and may be adapted and modified according to all variations and embodiments described with respect to the first and the second aspect, and vice versa.

In a step S1, a product bill of process, PdBoP, for a production plant 4 is provided, e.g. received as or within an electronic signal or programmed into a computing device by a user.

In a step S2, possible cells CEL are determined, wherein each cell CEL is either a production entity PET 5-$i$ or a combination of at least two production entities PETs 5-$i$. Preferably, all possible cells CEL of the production plant 4 are determined. The step S2 may be performed e.g. by the reasoning component 1A of the production support system 1 and/or in such a way as has been described with respect to the reasoning component 1A.

In a step S3, all those of the cells CEL determined in the step S2 are selected which address operations used in the PdBoP. The step S3 may be performed e.g. by the selection component 1B of the production support system 1 and/or in such a way as has been described with respect to the selection component 1B.

In a step S4, additional operation capabilities (or "emergent skills") for those of the cells CEL selected in the step S3 that comprise at least two production entities PET 5-$i$ are identified based on the operation capabilities of the individual production entities PET 5-$i$. The step S4 may be performed e.g. by the capabilities identifying component 1C of the production support system 1 and/or in such a way as has been described with respect to the capabilities identifying component 1C.

Step S4 may comprise at least one sub-step, in particular at least one of the following sub-steps S4-1, S4-2 and S4-3:

In the step S4-1, a planning problem is posed by providing a set of pre-conditions for the production plant and a set of post-conditions for the production plant 4. The step S4-1 may be performed e.g. by the planning component 1C-1 of the production support system 1 and/or in such a way as has been described with respect to the planning component 1C-1.

In the step S4-2, production entities PET 5-1, 5-2 of a cell CEL and their individual operation capabilities (or "skills") are added to the planning problem. The step S4-2 may be performed e.g. by the cell evaluating component 1C-2 of the production support system 1 and/or in such a way as has been described with respect to the cell evaluating component 1C-2.

In the step S4-3, a sequence of the individual operation capabilities is generated such that the planning problem is solved. The step S4-3 may be performed e.g. by sequence generating component 1C-3 of the production support system 1 and/or in such a way as has been described with respect to the sequence generating component 1C-3.

In a step S5, the PBoP is generated from the PdBoP using the operations generated in step S4. The step S5 may be performed e.g. by the a PBoP generating component 1D of the production support system 1 and/or in such a way as has been described with respect to the a PBoP generating component 1D.

Optionally, additional steps may be performed such as:
  outputting a list of the additional operation capabilities generated in step S4 to a user, e.g. using the output unit 1G of the production support system 1 and/or in such a way as has been described with respect to the output unit 1G;
  comparing compare the PBoP generated in step S5 to another PBoP, and outputting a comparator signal based on differences between the PBoP generated by the generating component 1D and the other PBoP, e.g. using the comparator unit 1H of the production support system 1 and/or in such a ways as has been described with respect to the comparator unit 1H;

providing the PBoP generated in step S5 to a user and to allow the user to select and/or adapt the PBoP, e.g. using the selector unit 1J of the production support system 1 and/or in such a way as has been described with respect to the selector unit 1J.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A production support system for generating a plant bill of process (PBoP) from a product bill of process (PdBoP) for a production plant, the production support system comprising:
   (a) a reasoning component for determining possible cells, wherein each cell is either a production entity or a combination of at least two production entities;
   (b) a selection component for selecting cells determined by the reasoning component that address operation capabilities used in the PdBoP;
   (c) an operation capabilities identifying component for identifying, by inference, additional operation capabilities for the cells selected by the selection component which comprise at least two production entities based on the operation capabilities of the individual production entities;
   (d) a PBoP generating component for generating the PBoP from the PdBoP using the additional operation capabilities identified by the operations identifying component; and
   (e) an executing component for controlling the production entities of the production plant based on the PBoP generated by the generating component.

2. The production support system according to claim 1, wherein the reasoning component is configured to determine the possible cells based on at least one of the following:
   a location of at least one production entity;
   a hardware property of at least one production entity;
   a software running on, or stored in, at least one production entity;
   a response time of at least one production entity.

3. The production support system of claim 1, wherein the operation capabilities identifying component comprises:
   a planning component for posing a planning problem by providing a set of pre-conditions for the production plant and a set of post-conditions for the production plant.

4. The production support system of claim 3, wherein the operation capabilities identifying component comprises:
   a cell evaluating component for adding production entities of a cell and individual operation capabilities to the planning problem.

5. The production support system of claim 4, wherein the operation capabilities identifying component comprises:
   a sequence generating component for generating a sequence of the individual operation capabilities such that the planning problem is solved.

6. The production support system of claim 1, comprising an output unit configured for outputting a list of the additional operation capabilities identified by the operation capabilities identifying component to a user.

7. A production plant comprising
   a plurality of production entities configured to perform production process steps of a production process; and
   a production support system according to claim 1.

8. A method for generating a plant bill of process (PBOP) from a product bill of process (PdBoP) for a production plant, the method comprising:
   providing the PdBoP for the production plant;
   determining possible cells, wherein each cell is either a production entity, or a combination of at least two production entities;
   selecting the cells determined by the reasoning component that address operations used in the PdBoP;
   identifying additional operation capabilities for the cells selected by the selection component which comprise at least two production entities based on operation capabilities of the individual production entities;
   generating the PBoP from the PdBoP using the operations identified by the operations identifying component; and
   controlling the production entities of the production plant based on the PBoP generated by the generating component.

9. The method according to claim 8, wherein determining the possible cells is based on at least one of the following:
   a location of at least one production entity);
   a hardware property of at least one production entity;
   a software running on, or stored in, at least one production entity; and
   a response time of at least one production entity.

10. The method of claim 8, wherein the identifying of the additional operation capabilities comprises:
    posing a planning problem by providing a set of pre-conditions for the production plant and a set of post-conditions for the production plant.

11. The method of claim 10, wherein the identifying) of the additional operation capabilities comprises:
    adding production entities of a cell and individual operation capabilities to the planning problem.

12. The method of claim 11, wherein the identifying of the additional operation capabilities comprises:
    generating a sequence of the individual operation capabilities such that the planning problem is solved.

13. A computer program comprising computer program code configured to, when executed, perform the method according to claim 8.

14. A computer program product, comprising a computer readable hardware storage device having computer readable program code stored therein, said program code executable by a processor of a computer system to implement the method according to claim 8.

* * * * *